United States Patent [19]
McEntee et al.

[11] Patent Number: 5,848,429
[45] Date of Patent: Dec. 8, 1998

[54] OBJECT-ORIENTED GLOBAL CURSOR TOOL WHICH OPERATES IN AN INCOMPATIBLE DOCUMENT BY EMBEDDING A COMPATIBLE FRAME IN THE DOCUMENT

[75] Inventors: Kevin J. McEntee, Scotts Valley; Jack R. Robson, Boulder Creek; Jeff Wishnie, San Francisco, all of Calif.

[73] Assignee: Object Technology Licensing Corporation, Cupertino, Calif.

[21] Appl. No.: 843,813

[22] Filed: Apr. 21, 1997

Related U.S. Application Data

[63] Continuation of Ser. No. 712,676, Sep. 13, 1996, abandoned, which is a continuation of Ser. No. 295,320, Aug. 23, 1994, abandoned.

[51] Int. Cl.$^6$ .................................................. G06F 17/21
[52] U.S. Cl. .......................... 707/515; 707/516; 707/530; 345/335; 345/339
[58] Field of Search ................................... 707/500, 502, 707/513, 514, 515, 516, 517, 530; 345/333, 334, 335, 338, 339, 347, 348, 349

[56] References Cited

U.S. PATENT DOCUMENTS

| | | | |
|---|---|---|---|
| 5,303,379 | 4/1994 | Khoyi et al. | 395/710 |
| 5,438,659 | 8/1995 | Notess et al. | 345/335 |
| 5,517,606 | 5/1996 | Matheny et al. | 345/352 |
| 5,551,055 | 8/1996 | Matheny et al. | 395/882 |
| 5,634,019 | 5/1997 | Koppolu et al. | 345/335 |

OTHER PUBLICATIONS

Vincent Alfieri, *The Best Book of WordPerfect Version 5.0*, Aston–Tate, 1998, pp. 6, 29, 72, 73, 217, 218, 228, 536.

Cowart, *Mastering Windows 3.1 Special Edition*, SYBEX Inc., 1993, pp. 357, 363–367 and screen printouts 1–9.

*Primary Examiner*—Stephen S. Hong

[57] ABSTRACT

An innovative system and method provide a cursor tool framework and tool server with support for multiple cursors on any given system, and supports the selection of a cursor tool utilizing a cursor. The framework and server facilitate the association of cursor tools to a cursor in a process independent space such that tools can be used cross-process and cross-document. The framework also provides default functionality for communication among cursor tools and the canvas on which they are used. This high degree of interaction allows any cursor tool and any document to function together such that the cursor tool can be written without the knowledge of the document developer. A frame creation tool awaits the detection of a mouse button depression. Then, a document component is created. The document component type is assigned at a tools inception. Then a rectangle interactor is invoked. The rectangle interactor provides a rubber band GUI pivoting around a first selected point. The interactor continues to process until the mouse button is released. Finally, the document component is embedded in the previously created frame. One global frame tool allows a user to interactively select a rectangular frame region and embed a document component in the frame.

18 Claims, 14 Drawing Sheets

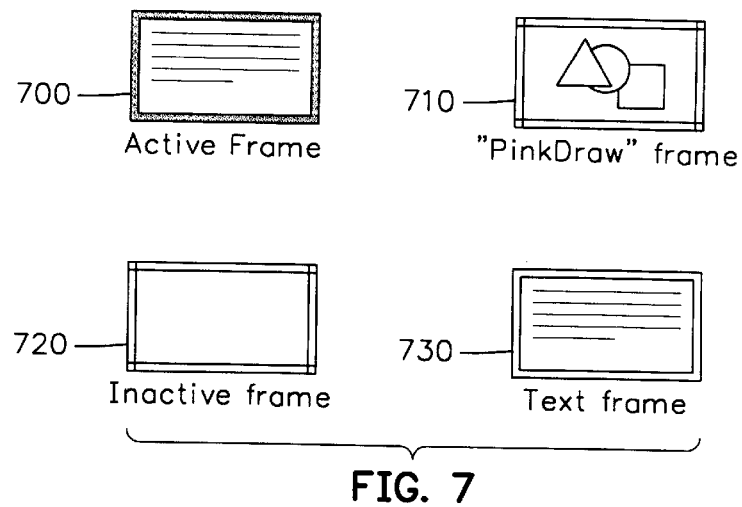
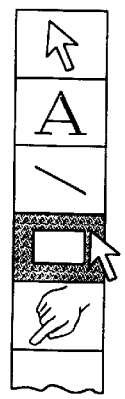
FIG. 7
FIG. 9
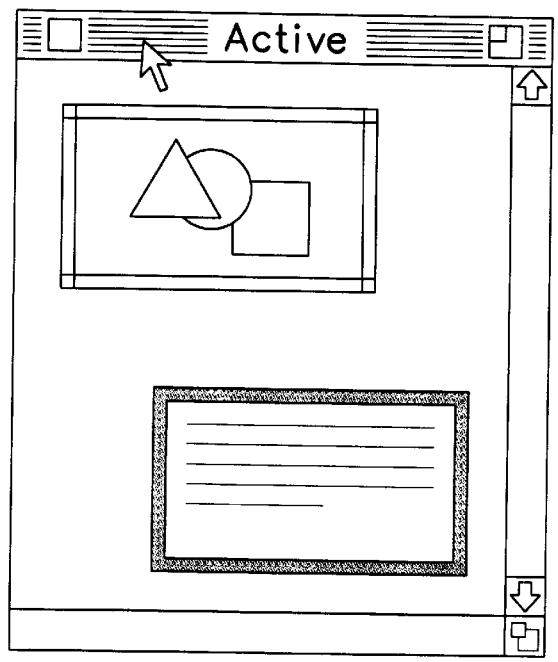
FIG. 10

| | Window | Frame |
|---|---|---|
| Activate On | Mouse-up | Mouse-down |
| First Click | can select and drag only | can alter contents |

OBJECT-ORIENTED GLOBAL CURSOR TOOL WHICH OPERATES IN AN INCOMPATIBLE DOCUMENT BY EMBEDDING A COMPATIBLE FRAME IN THE DOCUMENT

This application is a continuation, under 37 CFR §1.53, of application Ser. No. 08/712,676, filed on Sep. 13, 1996, now abandoned, which is a continuation of application Ser. No. 08/295,320, filed on Aug. 23, 1994, now abandoned.

MICROFICHE APPENDIX

A microfiche appendix which contains a single microfiche with 37 frames including a computer program listing is on file in connection with this application.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system and method for employing tool objects and menu of tool object in an object-oriented operating system.

BACKGROUND OF THE INVENTION

Cursor tools specify a particular mode of user interaction with a document or frame by changing the behavior of the user controlled "cursor." For example, a user can select a "rectangle" cursor tool to indicate to the operating environment that pressing the mouse button and dragging the mouse will result in the creation of a rectangle on a document drawing canvas. Tools can indicate modes for data selection, manipulation, or creation. Prior art examples of cursor tools can be found in applications such as MacPaint® or MacDraw®. However, these applications did not provide the user with management of more than one cursor at a time. Further, no integration into the operating system was provided to allow a tool active in one application to function in another application.

SUMMARY OF THE INVENTION

An innovative system and method apply object-oriented techniques to integrate cursor tools into an object-oriented operating system. This integration includes management of multiple cursor tools in multiple tasks at the same time. A cross application tool server capability is provided allowing any cursor tool and any application to function together. This unique capability includes cross-partition memory management allowing cursor tool usage across applications and across partitions. The object-oriented framework provides an architecture for the distribution of cursor tools across applications so that application requirements can be unaware of tools until the cursor tool function is requested. A frame creation tool in accordance with a preferred embodiment awaits the detection of a mouse button depression. Then, a document component is created. The document component type is assigned at a tools inception. Then, a rectangle interactor is invoked. The rectangle interactor provides a rubber band GUI pivoting around a first selected point. The interactor continues to process until the mouse button is released. Finally, the document component is embedded in the previously created frame.

BRIEF DESCRIPTION OF THE DRAWINGS

FIG. 7 illustrates some examples of various types of frames in accordance with a preferred embodiment;

FIG. 9 illustrates a user selection of a rectangle cursor tool, a creator in accordance with a preferred embodiment;

FIG. 10 illustrates the selection arrow in accordance with a preferred embodiment;

DETAILED DESCRIPTION OF THE INVENTION

Figure 1:
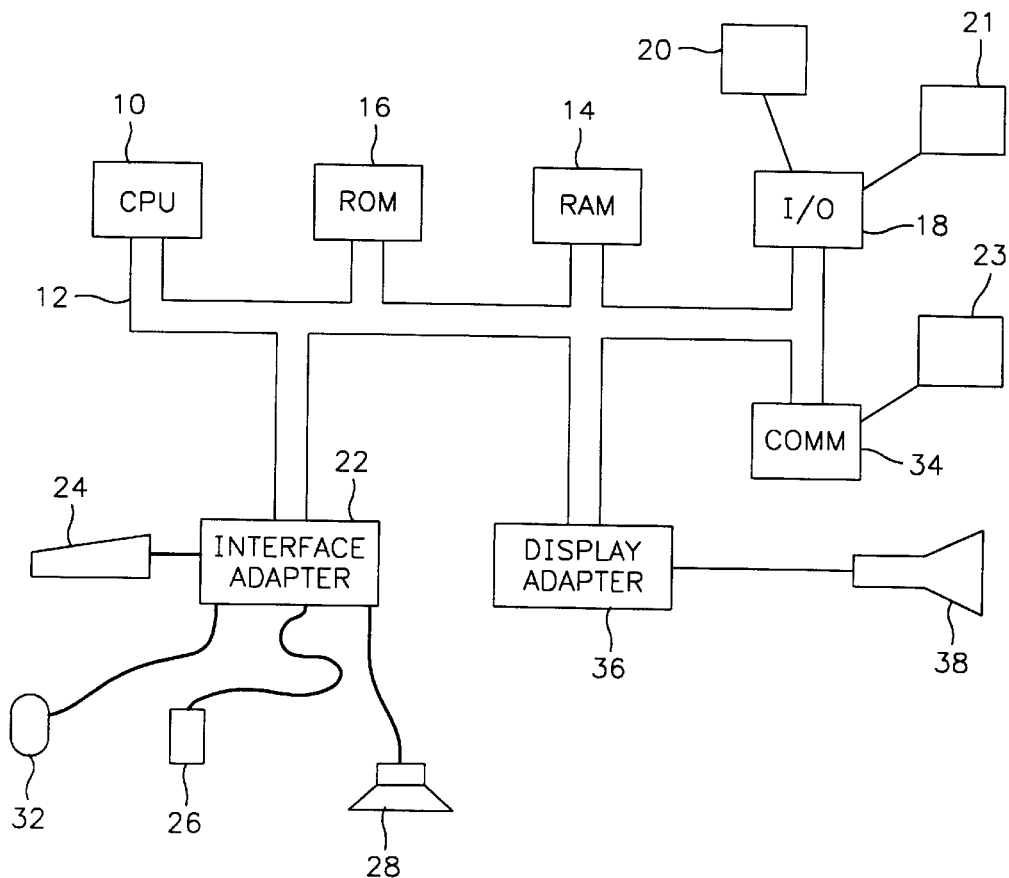
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7® operating system.

Object Oriented Programming Techniques

In a preferred embodiment, the invention is implemented in the C++ programming language using object-oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

As an aid to persons less versed in object-oriented principles, a class is a data structure that serves as a pattern for the creation of objects. A class can be thought of as a programmer-defined type, in which data members and the member functions of objects belonging to the class are defined.

In object-oriented programming, an object is a representation of an entity in terms of its attributes (the data it can contain) and its behaviors (the operations it can perform on that data). An object can represent a programming entity such as a pushdown stack, a window, a dialog box, or it can represent an abstraction of a real-world entity such as a chess piece or a rectangle. An object is an instance of a class, and the class serves as a template for creating objects. In C++ objects can be created either at compile time or at runtime.

In object-oriented programming, a mixin class is a class used to enhance the attributes and behaviors of a defined class using multiple inheritance which complement characteristics inherited from its primary base class. By design a mixin class is incomplete so it would not be used as a sole base class. By convention, mixin classes are identified by having the first letter of their name begin with a "M," for example, MGraphic and MResponder. Inheritance refers to the means by which a class includes in itself the behavior and type of another class, known as its base class, from which it is derived.

Instantiate is the creation of an object from a class.

A framework refers to a group of interrelated classes that provides a pre-fabricated structure to solve a set of related problems. A framework can be thought of as a skeleton program that is meant to be fleshed out by the programmer, with the sections of code provided by the programmer, and called by the framework.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise because it is easy for a developer to reuse their own objects, it is difficult to use objects from other systems, and a developer still needs to reach into the internal, non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially a groups of interconnected object classes that provide a pre-fabricated structure of a working application. For example, a user interface framework might provide the support and "default" behavior of drawing windows, scroll bars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and system integrators have acquired expertise in particular areas, such as manufacturing, accounting, or currency transactions. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations which have acquired expertise in vertical markets such as manufacturing, accounting, or bio-technology have a distribution mechanism for packaging, reselling, and deploying their expertise, and furthering the progress and dissemination of technology.

Historically, frameworks have only recently emerged as a mainstream concept on computing platforms. This migration has been assisted by the availability of object-oriented languages, such as C++. Traditionally, C++ was found mostly on UNIX systems and researcher's workstations, rather than on computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communication, printing, file systems support, graphic, etc. Commercial examples of application frameworks are MacApp (Apple), Bedrock (Symantec), OWL (Borland), NeXTStep App Kit (NeXT), and Smalltalk-80 MVC (ParcPlace).

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system frameworks implements I/O frameworks for SCSI devices, NuBus cards, and graphic devices. Because there is inherited functionality, each framework provides support for common functionality found in its device category. Other developers depend on these consistent interfaces various other devices.

A preferred embodiment takes the concept of frameworks and applies it throughout the entire system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially like writing domain-specific puzzle pieces that adhere to the framework protocol. In this manner, the whole concept of programming changes. Instead of writing line after line of code that calls multiple API hierarchies, software will be developed by deriving classes from preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented graphic framework. The program employs a new architecture to implement cursor tools. "Tools" are normally associated with icons that can be clicked to select the tool. Once selected, the tool, which can optionally change the cursor's shape, allows a user to draw in the content region of a document. MacPaint's paint-brush tool is a classic example of a cursor tool. These tools are referred to as cursor tools because they change the cursor and effect the data directly under the cursor. Characteristics that are associated with cursor tools include selection by clicking on a tool icon; and changing the current cursor shape to indicate a user is "holding" the selected tool. Cursor tools come in various types including creators, selectors, and selector/effectors. Creators are active over the content region of the active document. Selectors and Selector/Effectors are active only over frames of a type they understand, in the active document. If the view cannot use the tool, then the standard arrow cursor should apply. For example, if a yellow highlighting tool is selected, and the cursor is moved over an editable text view, the cursor changes to the image of a yellow highlighter. If a transliteration tool is selected and the cursor is moved over a graphic image, then nothing unusual would happen.

The code for this process is described below:

The desired accomplishment below is to show the minimal code necessary to create a view that will interact with a tool. In order to be able to work with tools, this view must eventually mixin or subclass classes that can provide information about tools and input device events. In a simple implementation, the view could subclass MToolHandler to handle tools and MMouseEventHandler to receive MouseEntered and MouseExited events. This view overrides the following MMouseEventHandler methods to determine when the cursor has entered its boundaries:

virtual Boolean MouseEntered (TMouseMovedEvent& mouseEnter);

virtual Boolean MouseExited (TMouseMovedEvent& mouseExit);

These two methods are called automatically as these events occur. The code that actually changes the cursor's image does so by first getting the current tool. If there is a valid current tool, it is asked to create its desired cursor graphic (an MGraphic). This graphic is then used to set the graphic of a TCursor, which is a static object representing the current cursor associated with the current input device (such as a mouse). The code would look something like this:

```
Boolean TYourView::MouseEntered (TMouseMovedEvent&mouseEvent)
{
  TTool* tool = TTool::CopyCurrentTool ( );
  if ( tool != NIL ) {
      MGraphic* cursorGraphic = tool->CreateCursorGraphic( );
      if ( cursorGraphic != NIL ) {
          TCursor theCursor;
          theCursor.SetGraphic (*cursorGraphic);
      }
      delete cursorGraphic;
  }
  delete tool;
  return FALSE; // let other event handlers have event
}
```

When the cursor leaves the area over the view, the cursor image should revert back to either the standard arrow cursor or whatever the cursor image was before. An example of C++ code in accordance with a preferred embodiment is presented below. One of ordinary skill in the art will realize that increases in performance can be obtained by caching the graphic image of the original cursor and as many of the cursor tool images as is practical to save in cache.

```
Boolean TYourView::MouseExited (TMouseMovedEvent&mouseEvent)
{
  TCursor theCursor;
  theCursor.SetGraphic (TStandardArrowTool.CreateCursorGraphic( )); //
  back to arrow
  return FALSE; // let other event handlers have event
}
```

It is possible that when a tool is selected (from a palette or other tool cluster), it might be desirable to change the cursor image at that time. The same process would occur whereby the code that sets the current tool would query the selected tool to obtain its cursor graphic, then it would pass that MGraphic to TCursor::SetGraphic.

Persistence

In the Apple Macintosh computer, the selected cursor tool persists within an application. For example, if you select the paint-brush tool in MacPaint, switch to MacDraw and select the Rectangle tool, and then switch back to MacPaint, the selected tool will be the paint-brush—the last tool you selected in MacPaint. In a preferred embodiment, tools will persist within a place, but not across places. For example, if a rectangle cursor tool is selected in one application, it will remain the selected cursor tool no matter which frame or document is made active.

Examples of Cursor Tools

There are two standard types of Cursor Tools: The TSimpleMouseTool and the TDelegatingMouseTool. The delegating mouse tool is a cursor tool that requests its instructions from the view that is being clicked in. These instructions are in the form of an "Interactor", which is an object that supplies information such as what to do while the mouse button is held down, what to do when the mouse is incrementally moved, and what to do when the mouse button is released. The other type of tool, the simple mouse tool, starts its own interactor. This is to say that it defines what it will do when it is used to click on an appropriate tool handling view or target. Common examples of tools are:

A polygon cursor tool: 

The arrow selection cursor tool: ▶

A color-grabber ("eyedropper") cursor tool: ✏

Cursor Tool Cluster

Figure 2:
FIG. 2 is an example of a prior art cursor tool cluster used in MacDraw.

Clusters are a means for logically and visually grouping related cursor tools. One can think of them as a view that holds various cursor tools. FIG. 2 is an example of a prior art cursor tool cluster used in MacDraw.

Command Panels

Command panels group and organize all of a frame's commands that do not appear directly on the frame furniture or in a frame's menu. Command panels provide interfaces to these commands through cursor tools (clustered or not), buttons, sliders, pull-down menus, scrolling lists, text-fields, additional panels, or any custom control a developer may create.

All command panels contain a frame-creation tool. This is a cursor tool that can be used to draw a frame of the type represented by the panel. For example, to instantiate a tool which could be used to create an Editable Text frame, the code would be as follows:

TStandardTextModel is the model associated faith editable text, while the TTextPresenterState is the presenter state editable text uses. Since the TFrameCreationToolFor is a templatized class, any combination of model/presenter state could be used to create an instance of a tool.

When the frame creation tool is used to select an area in an appropriate tool handling document (such as one capable of embedding an editable text model), an editable text frame is created and embedded in said document. In order to support the creation of frames, a view would need to handle tools in general as well as mixin the MFrameCreationToolHandler class. Beyond adding this class, the following method would be implemented:

```
void TSimpleEmbedderContentView::AdoptEmbedderModel(
                TEmbedderModel* theModel,
                TGPoint whereDropped, TGPoint frameSize)
{
  TSimpleEmbedderSelection* theSelection =
        new TSimpleEmbedderSelection( GetModelReference( ) );
  theSelection->SetInsertionPoint(whereDropped);
  TAbsorbDataCommand*theCommand = new
  TAbsorbDataCommand(theModel);
  TDocumentComponentCommandBindingTo<MDataExchanger>*
  theBinding = NIL;
  theBinding =
        new TGUIDocumentComponentCommandBindingTo<MData-
        Exchanger>(
        theCommand, theSelection, *GetGUIBundle( ),
        TStandardText("Accept Drop"));
  ::NonConst( (TDocumentComponentView *) this)->AdoptAndDo( the-
  Binding);
}
```

This method is called automatically by the MFrameCreationTool-Handler class when a tool of type MFrameCreationToolFor is used.

The relationship between a command panel and its frames is similar to the relationship between an application and its documents. The command panel can be used to create its frames, and it holds much of the interface for manipulating the frame and its contents. But there is a significant difference. In prior art tool systems, the application owns its documents, literally surrounding them. In a preferred embodiment, the document is supreme. The document owns and surrounds the frames, the command panel is simply a tool that a user can employ, using it to create or manipulate frames in a document.

In this model, an application is simply a command panel and a stationery pad designed to provide an interface to the commands for a frame of a particular type, and provide a frame creation cursor tool for the frame of its type. Command panels group controls that work on a single frame-type together, and vendors will often create a command panel for each of their frame types, so command panels may appear to group controls by vendor. For example, WordPerfect would develop a Wordperfect command panel for their Wordperfect frame type. For common frame-types, such as graph edit applications, there may be several different command panels. Command panels could eventually be user constructable, so that users could group all their image manipulation controls, from whatever vendor they choose, on a single command panel.

Figure 3:
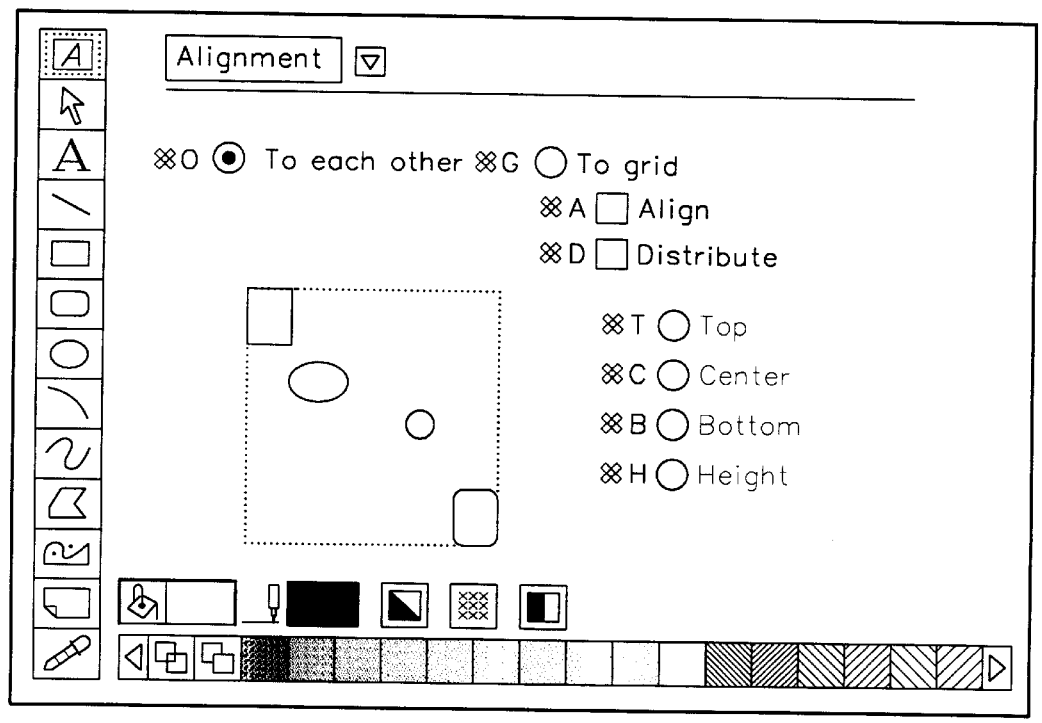
FIG. 3 is a command panel in accordance with a preferred embodiment.

A command can be accessed through the global command panel container or a command panel bar. The command panel for the active frame can be brought to the front with a multiple key sequence, such as a control-key press. FIG. 3 is a command panel in accordance with a preferred embodiment.

The command panel bar contains icons that represent various command panels that a user may have installed. In addition, the top two icons on the bar are special: the topmost icon always represents the command panel for the active frame, and the second icon always contains a command panel with a cluster of tools that apply globally to any frame-type. The icons include a selection arrow and an optional magnifier and color-grabber. Unlike earlier designs which suggested that the command panel bar would be filled with all the command panels of the frames in a document, or on the desktop, in this design, the user determines which panels are available.

Figure 4:
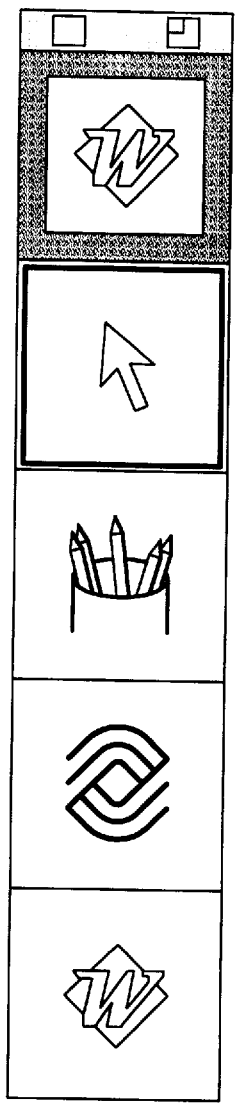
FIG. 4 illustrates an example of a command panel bar in accordance with a preferred embodiment.

Actions available to a user through command panels include the ability to click-drag an icon to pull out an associated command panel. Command panels may also be removed from the command panel bar and placed on the desktop. Single-clicking a command panel icon selects a default tool which is usually the frame creation tool. In the case of the select tool command panel, the default tool is the arrow selection tool. FIG. 4 illustrates an example of a command panel bar in accordance with a preferred embodiment.

Command Panel Container

Figure 5:
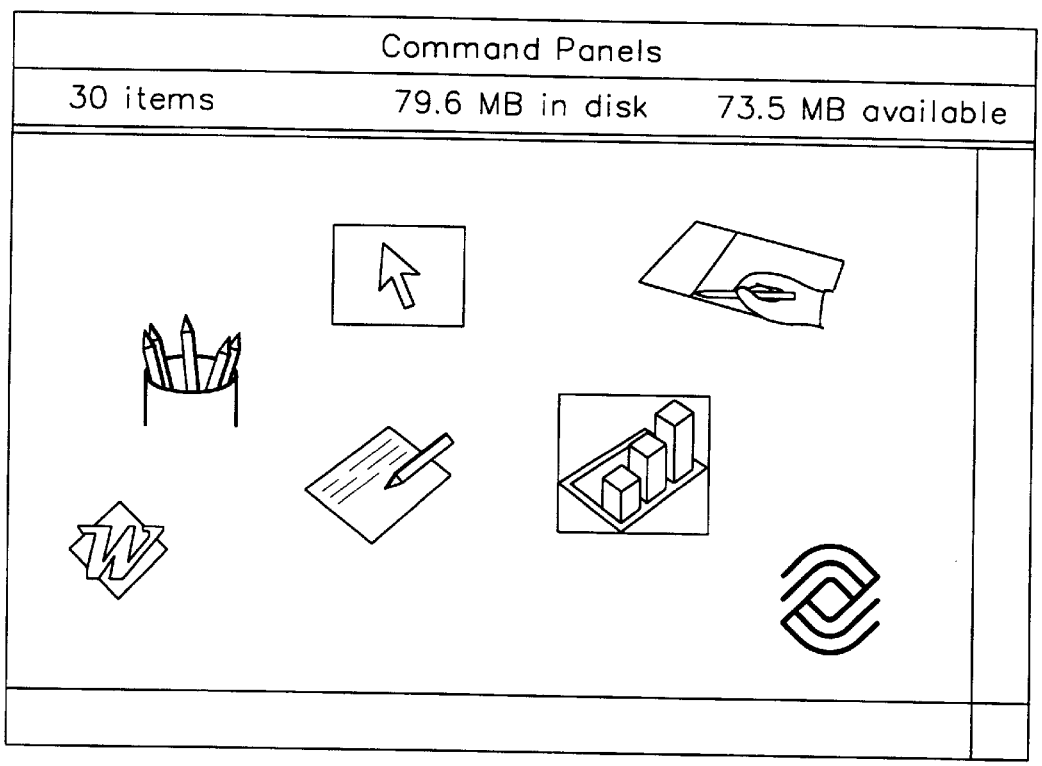
FIG. 5 illustrates an example of a command panel in accordance with a preferred embodiment.

When users install command panels, they are gathered into a global command panel container in the workspace. They can always access the panels in this container, or they can place them on various command panel bars. FIG. 5 illustrates an example of a command panel in accordance with a preferred embodiment.

Current Tool versus Active Tool

Figure 6:
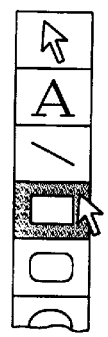
FIG. 6 is an illustration of a tool cluster in accordance with a preferred embodiment.

Users set the current cursor tool by selecting it from within a tool cluster. FIG. 6 is an illustration of a tool cluster in accordance with a preferred embodiment. The current tool only becomes active when the user moves the cursor over a screen region in which the tool can function. Whenever the cursor is in a region inappropriate for the current tool, the active tool reverts to the selection tool and the cursor shape reverts to the arrow.

Active regions

Active regions are only within the active document. Anywhere outside of the active document, including the active document's furniture, the active tool becomes the selection arrow. Within the active document, the active regions depend on the current tool and the type of the frame under the cursor. Because of click-through, whether a frame is active or not is unimportant. As mentioned above, cursor tools come in three categories: creators, selectors, and selector effectors.

Creator's create new data, i.e. a circle drawing tool.

Selectors select existing data, i.e. Photoshop's Magic Wand.

Selector/Effectors select and change data, i.e. MacPaint's eraser tool.

Creator cursor tools are active above all frames that can embed. If a user draws a circle on a frame without a circle data type, the Tool Framework will create a new frame that does understand circles, place the circle in the new frame, and embed the new frame into the existing frame. This explicit frame creation allows users to create data where they need it, when they need it, without having to first create the appropriate frame. Selector and Selector/Effector cursor tools are active only above frames of a type they understand. For example, the MacPaint eraser tool is only active above MacPaint frames. Above all other frames, the active tool becomes the selection arrow.

Figure 8:
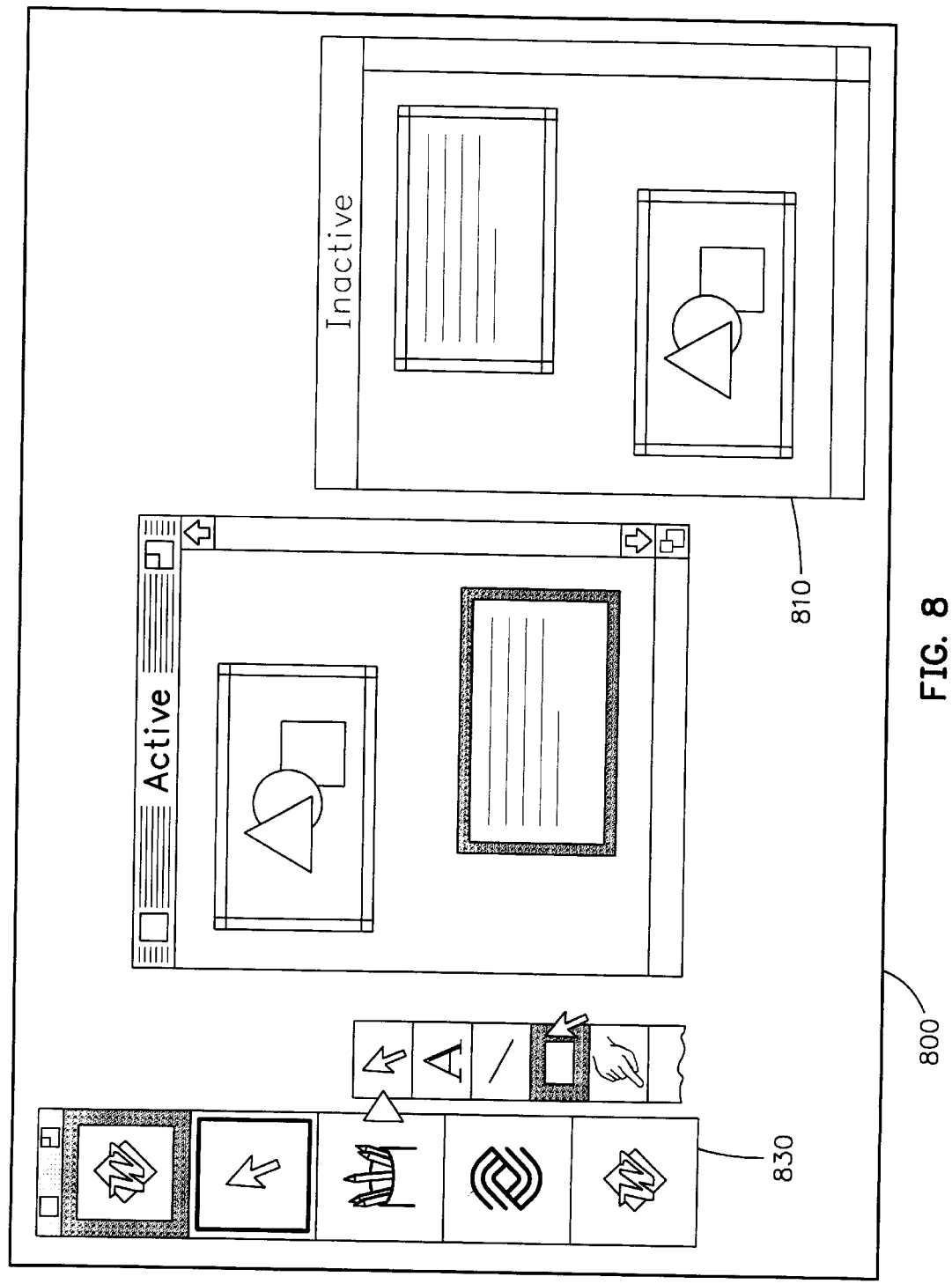
FIG. 8 illustrates a desktop with various frames in accordance with a preferred embodiment.

FIG. 7 illustrates some examples of various types of frames in accordance with a preferred embodiment. An Active frame 700, Inactive frame 720, PinkDraw frame 710 and Text Frame 740 each have distinguishing characteristics. FIG. 8 illustrates a desktop with various frames in accordance with a preferred embodiment. In the Figure, a user has two documents open, one active 800, the other inactive 810. Both documents have two frames, one PinkDraw frame and one Text frame. The user is choosing tools from PinkDraw's command panel 830.

FIG. 9 illustrates a user selection of a rectangle cursor tool, a creator in accordance with a preferred embodiment.

Figure 11:
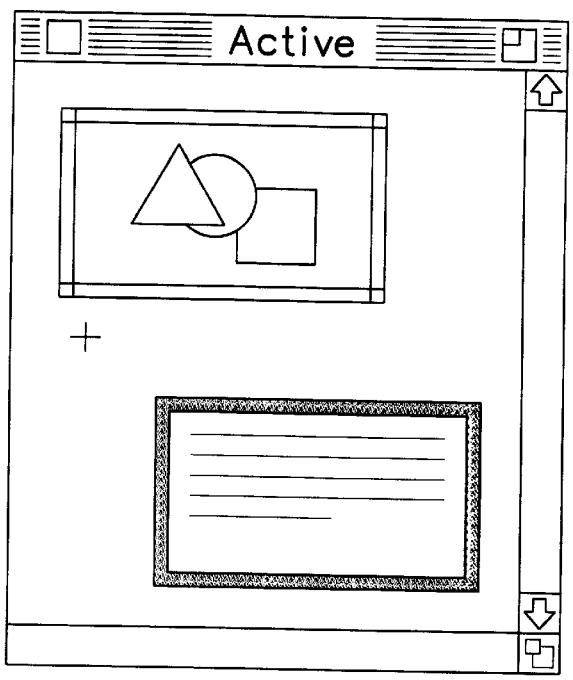
FIG. 11 illustrates the cursor rectangle tool becoming the active tool in accordance with a preferred embodiment.
Figure 12:
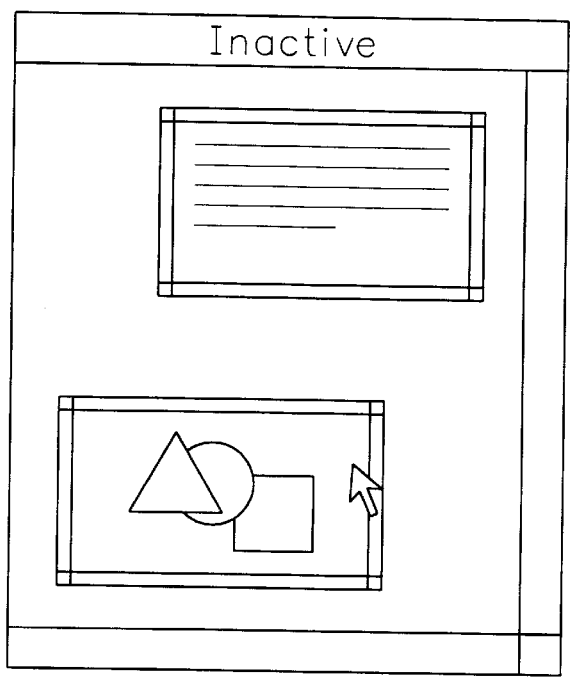
FIG. 12 illustrates the selection arrow passing over an inactive document, so the selection arrow becomes the active tool in accordance with a preferred embodiment.

Outside of the active document's content region (root-frame), the active tool is the selection arrow. FIG. 10 illustrates the selection arrow in accordance with a preferred embodiment. FIG. 11 illustrates the cursor rectangle tool becoming the active tool in accordance with a preferred embodiment. FIG. 12 illustrates the selection arrow passing over an inactive document, so the selection arrow becomes the active tool in accordance with a preferred embodiment.

Figure 14:
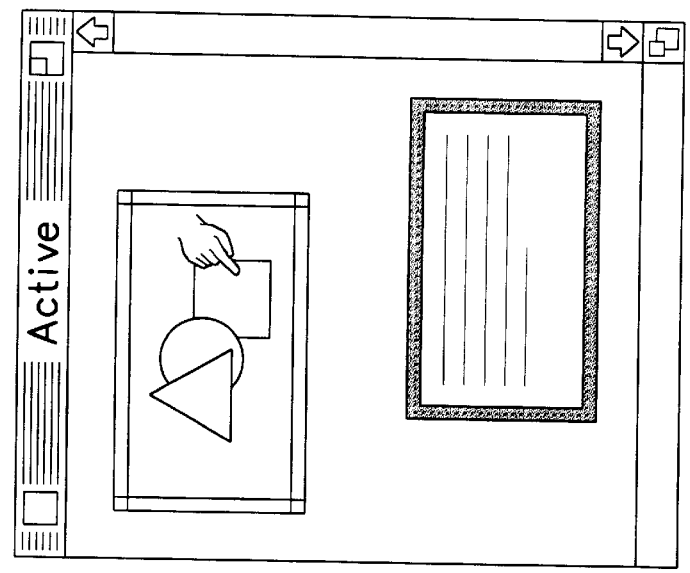
FIG. 14 illustrates enabling a smudge tool only when the cursor passes over a particular frame in accordance with a preferred embodiment.
Figure 13:
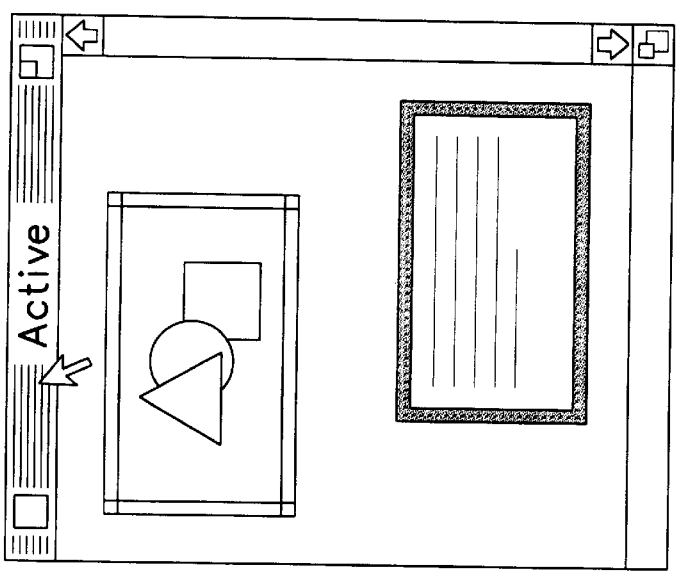
FIG. 13 illustrates the selection process for a smudge tool, a selector/effector, in accordance with a preferred embodiment.
Figure 13:
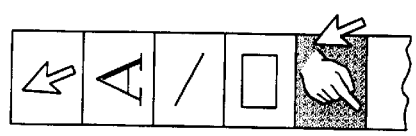
Figure 15:
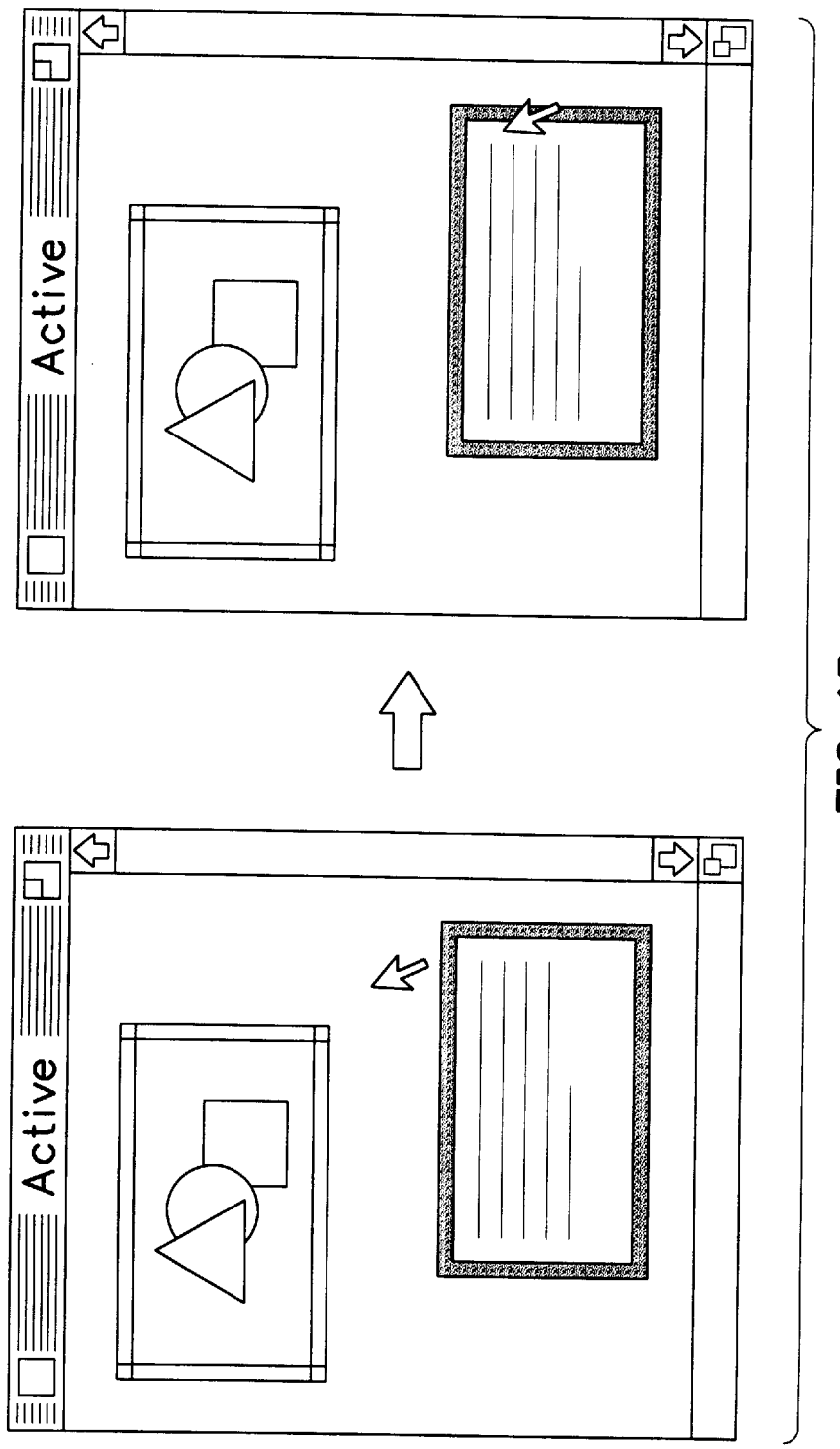
FIGS. 15 and 16 illustrate the dynamics of the tool cursor as it passes through a content region in accordance with a preferred embodiment.
Figures 16, 17:
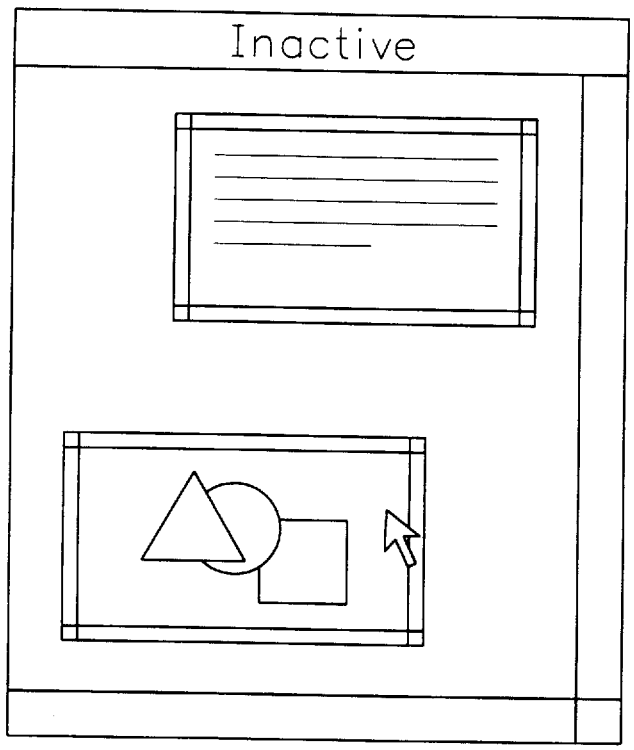
FIG. 17 summarizes the window and frame processing in accordance with a preferred embodiment.

FIG. 13 illustrates the selection process for a smudge tool, a selector/effector, in accordance with a preferred embodiment. FIG. 14 illustrates enabling a smudge tool only when the cursor passes over a particular frame in accordance with a preferred embodiment. FIGS. 15 and 16 illustrate the dynamics of the tool cursor as it passes through a content region in accordance with a preferred embodiment. As the cursor passes through a content region of the active document and other non-PinkDraw frames, the active tool becomes the selection tool.

Accessing/Retrieving Command Panels

There are several ways to access a command panel. Users can open a panel by double-clicking its icon from within the global panel container or any other workspace container. For any panels that have been placed on the Panel Bar, users can simply select the panel's icon and retrieve it. When users select a frame, they can issue a "Show command panel" command, and the workspace will open the default command panel for the current frame's type. So, If I select a PinkDraw frame and choose "Show command panel", the workspace will open the PinkDraw command panel.

Multiple command panels per Frame Type

Some document types can be opened by several applications. For example Painter, MacPaint, Photoshop, MacDraw, and TeachText can all open PICT files. In accordance with a preferred embodiment, certain frame types, such as images and text, will have many different command panels. To choose among all the possible command panels when working with a particular frame, a frame's property sheet allows users to select a command panel and even set a default command panel for a particular frame's type. The "Show command panel" command opens a default command panel.

Frame and Window Activation

It is important to understand how windows and frames are activated, because tools other than the selection arrow are only active within the active window. When discussing activation, there are two issues to consider. First, when does the window or frame activate? Second, how does the initial click into an inactive frame or window affect the data?

Frames

Frames must activate on mouse-down because their activation feedback may be important to the action the user is initiating. For example, if the user clicks down on a frame with the rectangle cursor tool, the frame must activate to show its bounds so that the user can know where the rectangle will be clipped. The first click within an inactive frame not only causes activation, but because of click-through effects, the contents of the frame behave as if the frame had already been active. So, if the eraser cursor tool is selected and used to draw across an inactive frame, the first click detected will erase some data.

Window

Windows activate when a mouse-up event occurs within their bounds. The mouse-up can come after a click within the window's bounds or as the user releases the mouse button when dragging an object into the window. Because windows do not activate until mouse-up, the active tool will always be the selection arrow during a drag. If the current tool is something other than the selection arrow, it will become active only after the drag has been completed and the target window has activated. The first click within an inactive window cannot affect the contents of the window other than to select or drag them. It is important that the first click do nothing damaging so that users can't accidentally destroy data by swiping a selector/effector tool across the screen. But, by letting the first click select and drag data, drag-and-drop actions are accelerated. Since the window will not activate until mouse-up, an object can be selected from an inactive window and dragged into an active window without ever causing the inactive window to come to the front. FIG. 17 summarizes the window and frame processing in accordance with a preferred embodiment.

Tools Architecture Overview

The Cursor Tools framework provides a structure for developing cursor tools that can be used across frames and documents, and provides the necessary system services for transporting tools from tool selection controls (such as a tool cluster or palette) to the frames where they can effect user data. The framework manages the overall tool appearance and behavior by providing these system services. The following classes are the main classes that comprise the Cursor Tools framework:

TTool—Base class for all cursor tools including TSimpleMouseTool and TDelegatingMouseTool. Additionally, provides static access methods for the ToolServer MToolTarget—A mixin class that provides selection targets for tools to work on TToolInteractor—Created by tools to respond to input and provide feedback while a selection is being made Commands—Created by tool interactors to modify tool targets TToolCommandBinding—Binds a command to a target MToolHandler—Part of application that services needs of tools TToolNegotiator—Matches a tool to a particular event such as a mouse click ToolServer—Stores and provides access to tools for multiple applications across multiple address spaces.

Cursor tools offer a way to decouple direct manipulation and interactive feedback from the rest of an application. As a result, developers can implement tools that will work on otherdeveloper's applications. Having two formal roles (that of a tool and that of a tool handler) is also a benefit within a single application since it reduces the impact of modifying the code.

Applications in a document explicitly support cursor tools by dispatching positionally targeted events, e.g. mouse events, to a tool negotiator. This is done on a view-by-view basis so an application could contain multiple views, some of which support cursor tools and others that do not. Each view also designates a tool handler, which is an object that answers requests of the tools framework. Typically, the view is also its own tool handler by mixing in MToolHandler.

The cursor tools framework handles events that are dispatched to it from an application by (1) identifying the current tool, (2) determining if the tool will work with the event, and (3) determining if the application can support the current tool. We can think of this process as the current tool attempting to work in a view of the application.

Tools work on targets. Each tool (1) specifies the type of target that it supports and (2) relies on the interface of that target class. When a tool attempts to work at a specific location in a view of an application that supports tools, the cursor tools framework asks the application's tool handler to create a target of the type that the tool wants and corresponding to the location of the tool. If the application can, it creates and returns a target for the tool to work on. If the application can create an acceptable target, then the cursor tools framework invokes the tool. The tool creates and starts a tool interactor, which creates, binds, and executes a command against the target. By changing the target the tool changes application data.

Setting and Distributing the Current Tool

Three objects work in concert to set and distribute the current tool. They are the TCursorToolSelectionState, the ToolServer, and the TTool.

TCursorToolSelectionState and SetCurrentToolCmd

When executed, the SetCurrentToolCmd takes a given Tool and sends it to the ToolServer. The SetCurrentToolCmd is designed to be used in places where Redo/Undo or collaboration capabilities are desirable. Since all commands have this functionality, it comes for free.

The most common method developers utilize to set a current tool is via a control such as a menu item or a button in a tool cluster or palette. To facilitate this processing, the cursor tool framework provides a CursorToolSelectionState class which is a momentary control state subclass. It is constructed using a Tool, which it adopts. It is then passed to the constructor of any momentary control. An example of this is as follows:

```
TTool* tool = new TMyTool;
TMomentaryMenuItem * menu = new TMomentaryMenuItem (
    new TCursorToolSelectionState (tool) );
```

The CursorToolSelectionState calls the static data method TTool::SetCurrentTool with the adopted tool when the momentary control is selected. The tool is then sent to the ToolServer, similar to the SetCurrentToolCmd.

ToolServer

The ToolServer's job is to associate Tools with Cursors. When the TTool::SetCurrentTool method sends a Tool to the tool server, the server keeps track of the tool as the current tool for the given cursor. Later, when an MToolHandler (usually a frame or view) asks the current tool for a given cursor, the ToolServer returns the appropriate tool to the requesting view. Note that it is necessary for the tool server to keep track of more than one cursor since multiple input devices may be in use at any given time.

Figure 18:
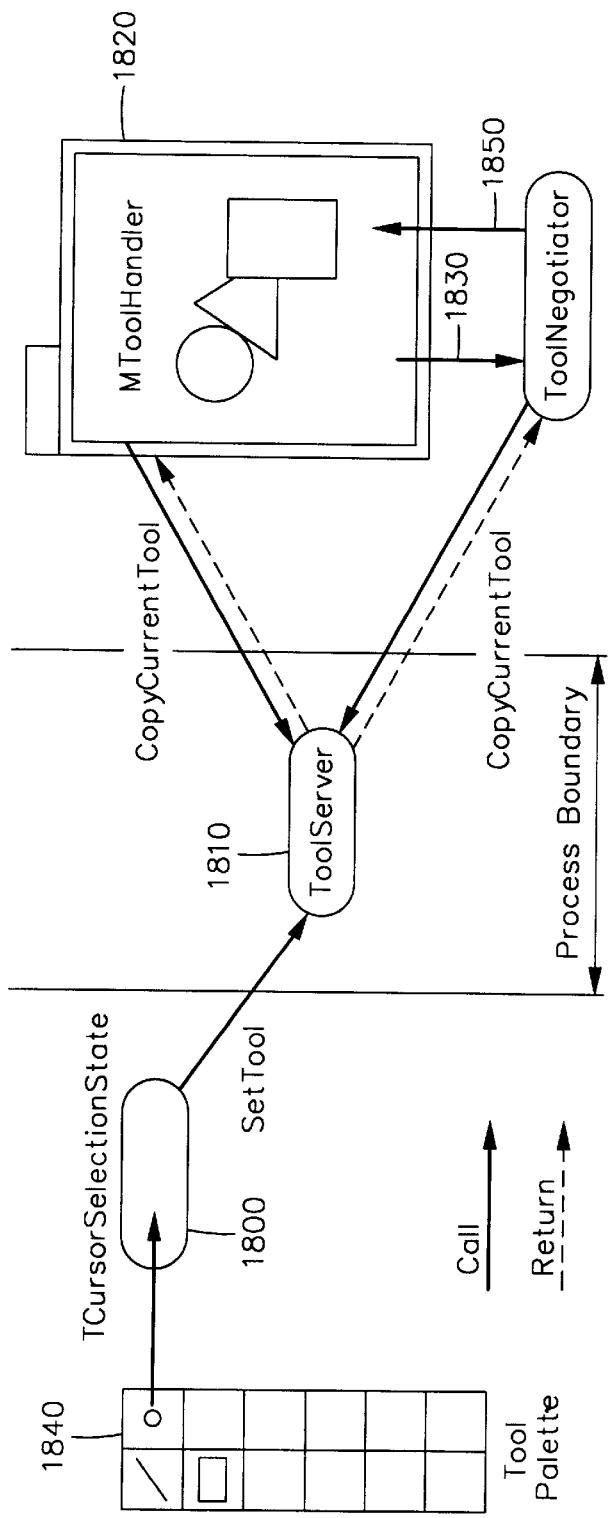
FIG. 18 is a flow diagram showing the logic of tool processing in accordance with a preferred embodiment.

The more detailed process for setting and using tools globally (via the tool server) is indicated by the Flow Diagram description and FIG. 18 on the following pages.

Sequence of Calls on MouseDown

In a many-cursor environment the view cannot be sure that the cursor that was active when the mouse button was pressed is the same as the cursor that most recently entered the bounds of the view, so it must again request the current tool associated with the cursor that moused down. The server returns the current tool and the tool negotiator dispatches the event to the appropriate event handling mechanism. In the case of a delegating mouse tool, this event handling mechanism is provided by the view targeted by the mouse click. In the case of a standard mouse tool, this event handling mechanism is provided by the tool itself. It is at this point that a ToolInteractor is started. The interactor takes over and proceeds to run the user interaction.

Flow Diagram

FIG. 18 is a flow diagram showing the logic of tool processing in accordance with a preferred embodiment. Processing commences at 1800 where a tool palette 1840 has detected the selection of a particular tool. At 1800, the current tool is activated by sending the information associated with the selected tool to the ToolServer 1810 via the TTool::SetTool static data method. TTool::SetTool sends the tool information to the ToolServer 1810 by calling the TToolServerCaller::SetTool method, which flattens the tool into a stream of bits and transports it to the server. On the ToolServer side, the bits are streamed back in and stored as the current tool.

The ToolServer 1810, in turn is called by the event handling mechanisms in the frame 1820. This would occur either when the cursor entered the region of the frame so the frame could change the graphic of the cursor, or when the user made some interaction on the frame such as pressing the mouse button. By mousing down inside the frame, the frame's DistributePositionalEvent method is called which creates a TToolNegotiator and passes the event at 1830. The TToolNegotiator requests the current tool from the ToolServer and matches the event with the tool. The tool handler (MToolHandler subclass) that is identified (that of the frame) is either asked for a target for the tool to work on in which case the Tool provides its own interactor to work with that target. Or, in the case of a delegating tool, the tool handler is asked to provide its own interactor. Thus it manages the relationship between its own interactor and the target(s) of the tool. An interactor is an object created in response to a user's mouse action to handle the event associated with the mouse action. An interactor often results in the creation of a command object once the system has determined the particular event associated with the mouse action.

When the ToolServer is queried for the current tool by either the frame or a ToolNegotiator, the ToolServer 1810 streams back the bits representing the current TTool. This information is then resurrected into an object of the appropriate TTool subclass type.

TTool

Figure 19:
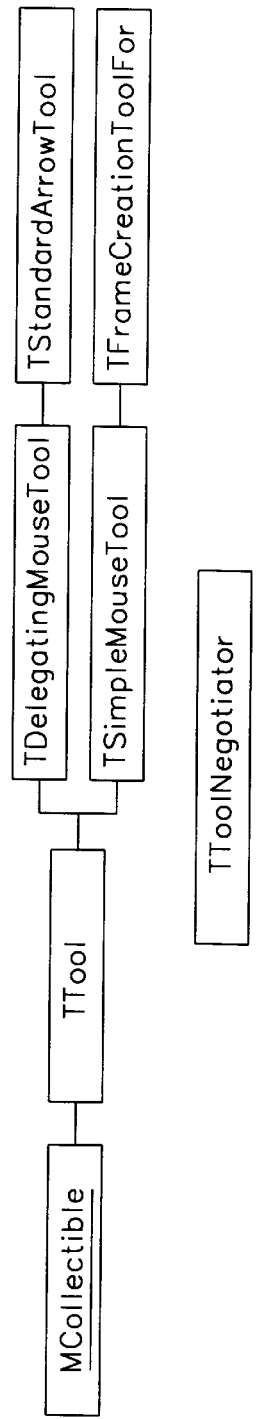
FIG. 19 is a diagram showing the class hierarchy in accordance with a preferred embodiment.

FIG. 19 is a diagram showing the class hierarchy in accordance with a preferred embodiment. Of particular interest are, TGlobalID GetID( ) const; which gets the tools ID; and virtual void SetID(TGlobalID); which sets the tool's ID. The cursor tools framework uses a tool's global ID to uniquely identify it within the tool server and to provide appropriate tool changed notification to tool setting commands. For more information on the detailed processing associated with notification processing reference can be made to US Pat. No. 5,315,703 to Taligent, Inc.

TTool is a base class for defining tools. It has several static methods for communicating with the tool server. TTool subclasses provide graphics and a text name for menus and tool palettes, a cursor graphic to represent the tool when active, a list of selection types for which the tool is valid, and it creates an interactor subclass that is activated when the user presses a mouse button in a valid frame with the tool selected. The object that performs the actual work of creating or modifying data in a frame is the interactor.

TTool Virtual Methods virtual MGraphic* CreatePaletteGraphic( ) const;
Subclasses must return a new MGraphic to used on a tool palette or a menu.
virtual void GetPaletteText(TText&) const;
Subclasses must set the TText's text to a string appropriate for a menu item representing the tool.
virtual MGraphic* CreateCursorGraphic( ) const;
Subclasses must return a new MGraphic to be used as the cursor when the tool is active.

TTool Static Methods For Accessing The Tool Server static void SetCurrentTool(const TTool& the Tool);
Sets "theTool" as the current tool.
static TTool* CopyCurrentTool( );
Returns a copy of the current tool.

TTool Static Methods For Creating Notification Interests static TInterest* CreateCurrentToolChangedInterest( );
Returns an interest used to recieve notification each time the current tool changes.
static TInterest* CreateCurrentToolTypeChangedInterest( );
Returns an interest used to receive notification each time the current tool changes to a tool of a different class.

MToolHandler

MToolHandler is mixed in to the portion(s) of an application that are responsible for supporting the tools framework. Typically this would be the view(s) that support tools.

MToolHandler Pure Virtual Methods virtual void AdoptAndDo (TToolCommandBinding*) =0;
virtual void DoBegin (TToolCommandBinding&) =0;
virtual void DoIncrement (TToolCommandBinding&) =0;
virtual void AdoptAndDoEnd (TToolCommandBinding*) =0;

These four methods should be overridden to process TToolCommandBindings (and execute the commands associated with them). This protocol is utilized by the TToolInteractor.

MToolHandler Virtual Methods virtual MToolTarget* CreateToolTarget (const TTypeDescription&, const TGPoint&)

Override CreateToolTarget to provide targets for tools to work on. The tools framework specifies the location within a frame that the tool should start its interaction, and it specifies the type of target that it requires (such as an MGraphic). From this information, any appropriate targets at that location would be supplied.

virtual TToolInteractor* CreateToolInteractor (const TGPoint&, const TToken& hint)

Override CreateToolInteractor to create interactors for the tool framework to start. The tools framework calls CreateToolInteractor when a delegating tool must work on a view as the result of a user mousing down in a valid frame. A delegating tool is a tool that has polymorphic behavior across applications and is target-type neutral, such as the arrow tool. Polymorphic behavior refers to the object-oriented mechanism by which objects of different classes related by inheritance respond uniquely to the same member function call.

virtual Boolean SupportsFeedback ( ) const virtual void AdoptFeedbackGraphic (MGraphic*, const TGArea& total, const TGArea& changed);
virtual MGraphic* OrphanFeedbackGraphic (Boolean repair=TRUE);

These three feedback methods provide simple feedback mechanisms that are used by tool interactors. The tool handler subclassers can override the methods to provide more complicated feedback during tool interaction.

TSimpleMouseTool

A simple TTool subclass that uses a mouse down event to create and start an interactor.

TSimpleMouseTool starts its own interactor which is supplied by a subclass that overrides the following CreateInteractor pure virtual method:

virtual TToolInteractor* CreateInteractor( )=;

TDelegatingMouseTool

A simple TTool subclass that starts an application supplied interaction upon receiving a mouse down event. When a mouse down event is received, the delegating mouse tool asks the tool handler to provide a tool interactor which is then started by the delegating mouse tool.

TStandardArrowTool

A simple TDelegatingMouseTool subclass with the following attributes:

Palette Graphic: The standard Pink Arrow.
Cursor Graphic: The standard Pink Arrow.
Palette Text: "Arrow".
Tool Interactor: The interactor is supplied as needed by the application that the tool is used on, as with all TDelegatingMouseTools.

TToolNegotiator

An event handler (usually a view) creates a negotiator and dispatches the current event to it.

The negotiator interfaces with the cursor tools framework to match a tool with the event. If successful, the tools framework will call back the tool handler that is identified to request either a target for the tool to work on (in the case of a simple mouse tool) or an interactor (in the case of a delegating tool).

TToolInteractor

TToolInteractor subclasses from TInteractor and is the base class for all tool interactors. The following four methods were implemented to facilitate the appropriate interactions (such as feedback) that result from a mouse down event in an appropriate tool handling frame.

CALLER / DISPATCHER CLASSES

TToolServer

Figure 20:
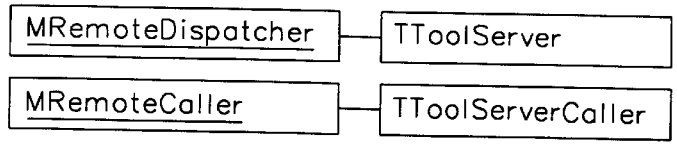
FIG. 20 is a TToolServer class diagram in accordance with a preferred embodiment.

TToolServer is a dispatcher class that implements the tool server. FIG. 20 is a TToolServer class diagram in accordance with a preferred embodiment.

TToolServerCaller

TToolServer Caller is the dispatcher class used by TTool to communicate with the tool server. You should never have to instantiate one of these or speak to one directly.

COMMAND CLASSES

TSetCurrentToolCmd

Figure 21:
FIG. 21 illustrates the command classes in accordance with a preferred embodiment.

Sets the current tool in the tool server to its bound tool. FIG. 21 illustrates the command classes in accordance with a preferred embodiment.

TSetCurrentToolCmd(const TTool& theTool)

Constructs a command with the Tool as its bound tool.

void SetTool(const TTool& theTool)

Sets theTool as the commands bound tool. The command discards its old tool, if it had one.

Boolean GetSelected( )

Returns whether the commands bound tool is the current tool (i.e. whether a control holding this command should shows itself as "selected").

void SetSelected(Boolean)

Can be used as a controls CommandBooleanSetter, but it really does nothing. The command sets its selected state based solely on notification from the tool server.

TInterest* CreateSelectionStateChangedInterest( ) const

Use this interest to receive notification when the selected state of a particular command changes. The command uses this interest when a control calls TSetCurrentToolCmd::ConnectData( ).

TSetToDefaultToolCmd

Sets the current tool to the default tool.

CURSOR GRAPHICS

Figure 22:
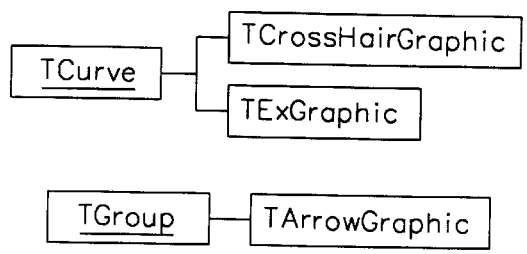
FIG. 22 illustrates some of the pre-built geometries in accordance with a preferred embodiment.

MGraphic subclasses with pre-built geometries. FIG. 22 illustrates some of the pre-built geometries.

TCrossHairGraphic

A draw program style cross hair

TExGraphic

A big pink X, used for debugging✗

TArrowGraphic

An arrow↖

UTILITY CLASSES

TToolInstanceInterest

Figure 23:
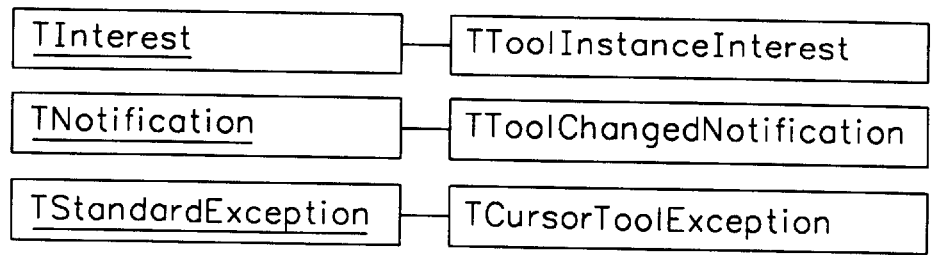
FIG. 23 illustrates the utility classes in accordance with a preferred embodiment.

This object is constructed with a TTool. It expresses an instance of a TTool becoming the current tool. FIG. 23 illustrates the utility classes in accordance with a preferred embodiment.

TToolInstanceInterest(const TTool&, MNotifier*, const TToken&)

TToolChangedNotification

The Tool Server throws TToolChangedNotification every time the current tool changes.

TCursorToolException

The exception subclass thrown by the Cursor Tool framework.

Errors defined by TCursorToolException kNoBoundCursor =0x1D02

TSetCurrentToolCmd::Do( )called with no bound cursor. This exception is currently not used. It will be thrown when the cursor server supports multiple cursors. At that time, programmers will need to bind both a tool and a cursor to the command before issuing it.

kNoBoundToolInCommand=0x1D02

Thrown when trying to call a method on TSetCurrentToolCmd that requires a bound tool when the command has no bound tool.

kNoBoundToolInServer=0x1D03

Thrown when trying to call a method on TToolServer that requires a current tool before a current tool has been set.

Figure 24:
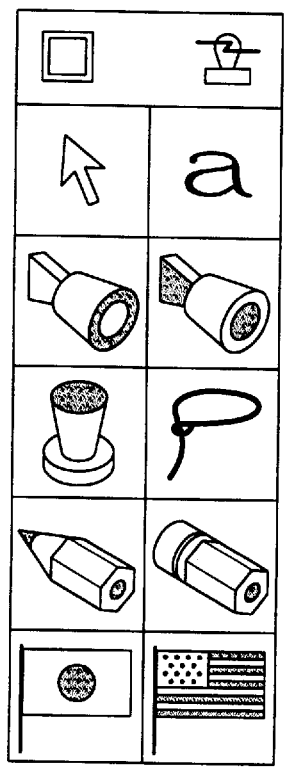
FIG. 24 is another illustration of a tool cluster in accordance with a preferred embodiment.
Figure 25:
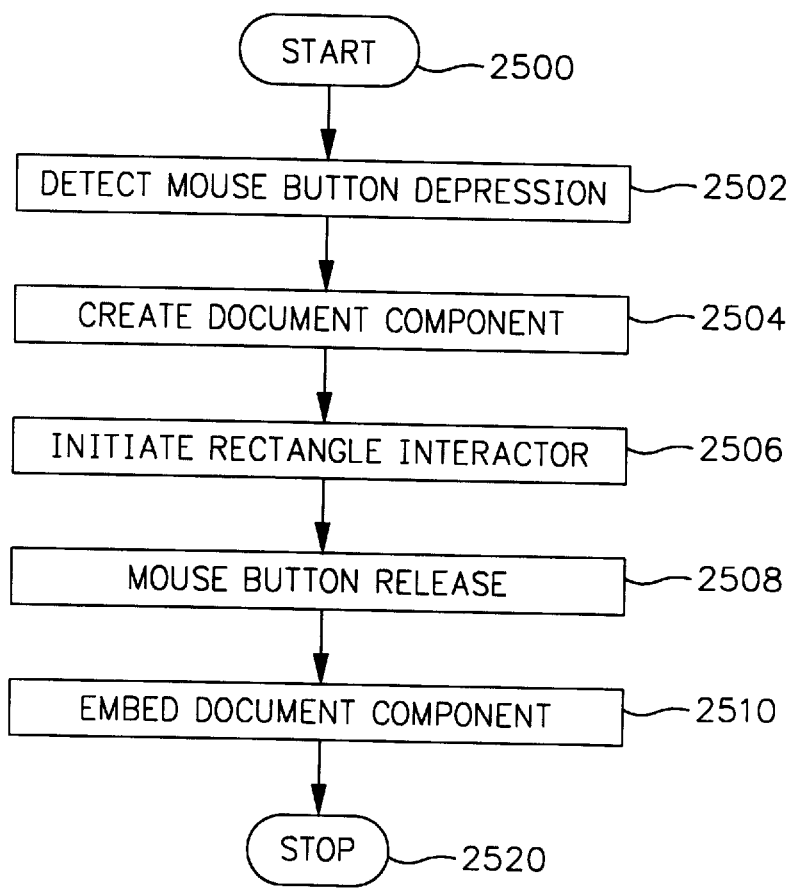
FIG. 25 is a flowchart of frame tool processing in accordance with a preferred embodiment.

A C++ listing in accordance with a preferred embodiment is presented below. The code is used to create the tool cluster presented on a display and captured in FIG. 24.

We claim:

1. A method for performing a cursor tool operation in response to a user request on a computer with a display device having displayed thereon a cursor and a document window with a first document component therein and a cursor tool object having a member function for performing the cursor tool operation the method comprising the steps of:

(a) determining whether the first document component is compatible with the cursor tool object member function;

(b) creating a second document component in response to the user request when the first document component is not compatible with the cursor tool object member function, the second document component being compatible with the cursor tool object member function;

(c) embedding the second document component in the document window at the cursor location; and (d) executing the cursor tool object member function to perform the cursor tool operation within the second document component.

2. A method as recited in claim 1, wherein the cursor tool operation is a creation operation.

3. A method as recited in claim 1, wherein step (a) comprises the steps of:

(a1) creating a tool negotiator object in response to the user request; and (a2) calling a member function in the tool negotiator object to determine whether the first document component is compatible with the cursor tool object member function.

4. A method as recited in claim 1, wherein step (b) comprises the steps of:

(b1) creating a frame creation tool object;

(b2) calling a first member function in the frame creation tool object to create a second document component which is compatible with the cursor tool object member function;

(b3) calling a second member function in the frame creation tool object to obtain a frame size; and (b4) creating a frame in accordance with the frame size.

5. A method as recited in claim 4, wherein step (b3) comprises the steps of:

(b3a) calling a third member function in the frame creation tool object to create a rectangle interactor; and (b3b) retrieving frame size parameters from the rectangle interactor.

6. A method as recited in claim 4, wherein step (c) comprises the steps of:

(c1) sizing the second document component in accordance with the frame size; and (c2) embedding the second document component in the frame.

7. Apparatus for performing a cursor tool operation in response to a user request on a computer with a display device having displayed thereon a cursor and a document window with a first document component therein and a cursor tool object having a member function for performing the cursor tool operation, the apparatus comprising:

a tool negotiator which determines whether the first document component is compatible with the cursor tool object member function;

a creation mechanism for creating a second document component in response to the user request when the first document component is not compatible with the cursor tool object member function, the second document component being compatible with the cursor tool object member function;

an embedder function which embeds the second document component in the document window at the cursor location; and a calling mechanism for executing the cursor tool object member function to perform the cursor tool operation within the second document component.

8. Apparatus as recited in claim 7, wherein the cursor tool operation is a creation operation.

9. Apparatus as recited in claim 7, wherein the tool negotiator comprises:

a constructor function for creating a tool negotiator object in response to the user request; and a DispatchEvent member function in the tool negotiator object which determines whether the first document component is compatible with the cursor tool object member function.

10. Apparatus as recited in claim 7, wherein the creation mechanism comprises:

a constructor mechanism for creating a frame creation tool object;

a first member function in the frame creation tool object which creates a second document component which is compatible with the cursor tool object member function;

an interactor mechanism in the frame creation tool object which obtains a frame size; and a mechanism for creating a frame in accordance with the frame size.

11. Apparatus as recited in claim 10, wherein the interactor mechanism comprises:

a third member function in the frame creation tool object which creates a rectangle interactor; and means for retrieving frame size parameters from the rectangle interactor.

12. Apparatus as recited in claim 11, wherein the embedding function comprises:

means for sizing the second document component in accordance with the frame size; and means for embedding the second document component in the frame.

13. A computer program product for performing a cursor tool operation in response to a user request on a computer with a memory, a display device having displayed thereon a cursor and a document window with a first document component therein and a cursor tool object having a member function for performing the cursor tool operation, the computer program product comprising a computer usable medium having computer readable program code thereon including:

program code for constructing in the memory a tool negotiator which determines whether the first document component is compatible with the cursor tool object member function;

a creation mechanism for creating a second document component in the memory in response to the user request when the first document component is not compatible with the cursor tool object member function, the second document component being compatible with the cursor tool object member function;

an embedder function which embeds the second document component in the document window at the cursor location; and a calling mechanism for executing the cursor tool object member function to perform the cursor tool operation within the second document component.

14. A computer program product as recited in claim 13, wherein the cursor tool operation is a creation operation.

15. A computer program product as recited in claim 13, wherein the tool negotiator construction program code comprises:

a constructor function for creating a tool negotiator object in the memory in response to the user request; and a DispatchEvent member function in the tool negotiator object which determines whether the first document component is compatible with the cursor tool object member function.

16. A computer program product as recited in claim 13, wherein the creation mechanism comprises:

a constructor mechanism for creating a frame creation tool object in the memory;

a first member function in the frame creation tool object which creates a second document component which is compatible with the cursor tool object member function;

an interactor mechanism in the frame creation tool object which obtains a frame size; and a mechanism for creating a frame in accordance with the frame size.

17. A computer program product as recited in claim 16, wherein the interactor mechanism comprises:

a third member function in the frame creation tool object which creates a rectangle interactor; and means for retrieving frame size parameters from the rectangle interactor.

18. A computer program product as recited in claim 17, wherein the embedding function comprises:

means for sizing the second document component in accordance with the frame size; and means for embedding the second document component in the frame.

* * * * *